(12) United States Patent
Durston et al.

(10) Patent No.: US 7,143,040 B2
(45) Date of Patent: Nov. 28, 2006

(54) INTERACTIVE DIALOGUES

(75) Inventors: Peter J Durston, Ipswich (GB); David J Attwater, Ipswich (GB)

(73) Assignee: British Telecommunications public limited company, London (GB)

( * ) Notice: Subject to any disclaimer, the term of this patent is extended or adjusted under 35 U.S.C. 154(b) by 851 days.

(21) Appl. No.: 10/312,984

(22) PCT Filed: Jul. 19, 2001

(86) PCT No.: PCT/GB01/03261

§ 371 (c)(1),
(2), (4) Date: Jan. 3, 2003

(87) PCT Pub. No.: WO02/09094

PCT Pub. Date: Jan. 31, 2002

(65) Prior Publication Data

US 2003/0130849 A1    Jul. 10, 2003

(30) Foreign Application Priority Data

Jul. 20, 2000  (EP) .................................. 1306183
Feb. 16, 2001  (EP) .................................. 1301395

(51) Int. Cl.
*G10L 21/06* (2006.01)
(52) U.S. Cl. ........................ 704/270; 704/277
(58) Field of Classification Search ............. None
See application file for complete search history.

(56) References Cited

U.S. PATENT DOCUMENTS 5,685,000 A    11/1997  Cox, Jr.

6,665,640 B1 *  12/2003  Bennett et al. ............. 704/257

FOREIGN PATENT DOCUMENTS

| WO | WO 96/18260 | 6/1996 |
| WO | WO 96/22568 | 7/1996 |
| WO | WO 98/50907 | 11/1998 |
| WO | WO 00/55843 | 9/2000 |

OTHER PUBLICATIONS

Attwater et al, "Towards Flueny-Structured Dialogues with Natural Speech Input", BT Technology Journal, BT Laboratories, GB, vol. 17, No. 1, Jan. 1999, pp. 178-186, XP000824591.
Takebayashi, "Spontaneous Speech Diologue System Tosburg II—The User-Centered Multimodal Interface", Systems & Computers in Japan, US, Scripta Technica Journals, New York, US, vol. 26, No. 14, Nov. 15, 1995, pp. 77-91, XO000551716.
Albesano et al, "Dialogos: A Robust System for Human-Machine Spoken Dialogue on the Telephone", IEEE International Conference on Acoustics, Speech, and Signal Processing (ICASSP), US, Los Alamitos, IEEE Comp. Soc. Press, Apr. 21, 19997, pp. 1147-1150, XP000822655.

* cited by examiner

*Primary Examiner*—Susan McFadden
(74) *Attorney, Agent, or Firm*—Nixon & Vanderhye P.C.

(57) ABSTRACT

An interactive dialogue apparatus generates prompts and receives responses which it processes and stores response data. Progress of the dialogue is controlled using a state model which is parsed, comparing transition conditions with the stored response data, stopping at a state for which no edge condition is satisfied. Each time a fresh response is received, the model is reparsed from the start. Prompts are generated by reference to a state history, being selected by finding the longest match between the history and state sequences associated with stored prompts. Prompts are compared so that the dialogue may be terminated in the event of repetition.

24 Claims, 8 Drawing Sheets

INTERACTIVE DIALOGUES

This application is the US national phase of international application PCT/GB01/03261 filed 19 Jul. 2001 which designated the U.S.

This invention relates to an interactive dialogue apparatus and methods, particularly, though not exclusively, those using voice input and/or output, preferably using natural language interface techniques.

One particular example of such dialogues is for automated telephone call routing.

Interactive voice response (IVR) systems are discussed in "Towards fluency-structured dialogues with natural speech input", D. J. Attwater, J. S. Fisher and H. R. Greenhow, BT Techol. J. Vol 17, No. 1, January 1999. This describes an architecture which follows a dialogue structure in which speech input is recognised and analysed to extract information, and voice prompts are generated, dependent on the history of nodes visited in the dialogue structure.

WO 9618260 discloses an automatic telephone answering system producing dynamically variable linguistic outputs assembled according to real-time processing of history data based on a plurality of the previous caller responses in the dialogue.

"Spontaneous speech dialogue system TOSBURG II—the user centered multimodal interface" by Yoichi Takeyabashi, Systems & Computers in Japan, US, Scripta Technical Journals, New York, Vol. 26, No. 14, 15 November 1995, pp. 77–91, shows the use of a speech dialogue system with a dialogue manager employing a state transition model. Again, history data of the dialogues are updated based on the result of the dialogue understanding, and a response generated. Takeyabashi also envisages a multi-mode output, including synthesised speech, text and images.

According to one aspect of the invention there is provided an interactive dialogue apparatus comprising:
  means for generating prompts to be output;
  means for processing input responses to produce response data;
  a store for storing response data;
  a store storing data defining an initial state, a plurality of subsequent states, possible transitions between states, and for each transition an associated condition to be satisfied before that transition is deemed allowable, at least some of said conditions involving the stored response data; and
  control means operable to
  (a) perform a parsing operation in which it examines whether transition conditions are satisfied so as to identify a subsequent state in respect of which—
    (i) the condition(s) associated with the transition(s) from a reference state to that state are satisfied, and
    (ii) no conditions associated with any transition from that state are satisfied;
  (b) select, in dependence upon the state thus identified, a prompt to be output;

wherein the control means is operable upon receipt of a response to repeat the parsing operation using said initial state as the reference state.

In another aspect there is provided an interactive dialogue apparatus comprising:
  means for generating prompts to be output;
  means for processing input responses to produce response data;
  a store for storing response data;
  a store storing data defining an initial state, a plurality of subsequent states, possible transitions between states, and for each transition an associated condition to be satisfied before that transition is deemed allowable, at least some of said conditions involving the stored response data;
  a state history store; and
  control means operable to
  (a) perform a parsing operation in which it examines whether transition conditions are satisfied so as to identify a subsequent state in respect of which—
    (i) the condition(s) associated with the transition(s) from a reference state to that state are satisfied, and
    (ii) no conditions associated with any transition from that state are satisfied;
  (b) record the identified state in the history store;
  (c) select, in dependence upon the contents of the history store, a prompt to be output;

wherein the apparatus includes a prompt definition store for storing a plurality of prompt definitions, each prompt definition having a sequential pattern of one or more states associated with it, and the control means is arranged to select, of those prompts having associated with them a sequential pattern which matches at least the most recent part of the sequence of states in the state history store, the prompt having the longest such match.

In a further aspect—which does not presuppose the use of a state model—there is provided an interactive dialogue apparatus comprising:
  means for generating prompts to be output;
  means for processing input responses to produce response data;
  control means operable to perform a dialogue process in which it selects, in dependence upon the response data, a prompt to be output;
  means for storing the most recent prompt that has been output;
  means operable to compare the selected prompt with the stored most recent prompt and in the event of a match to terminate the dialogue process.

The invention also extends to corresponding methods. Other aspects of the invention are defined in the claims.

An embodiment of the invention will now be described, by way of example only, with reference to the accompanying drawings in which.

There will now be described a natural language dialogue system. In this example, the system is part of a telephone call steering system the ultimate objective of which is to ascertain, from a caller, sufficient information to decide where the call should be routed to and pass this information to the telephone network which actually routes the call. However it is also suitable for many other applications. In particular, although the system described uses speech recognition and speech synthesis techniques for conducting a spoken dialogue, the same principles could also be applied to systems using other forms of input/output such an text, or indeed to mixtures of communication modes (e.g. text input and voice output) or systems using more than one such mode simultaneously.

Figure 1:
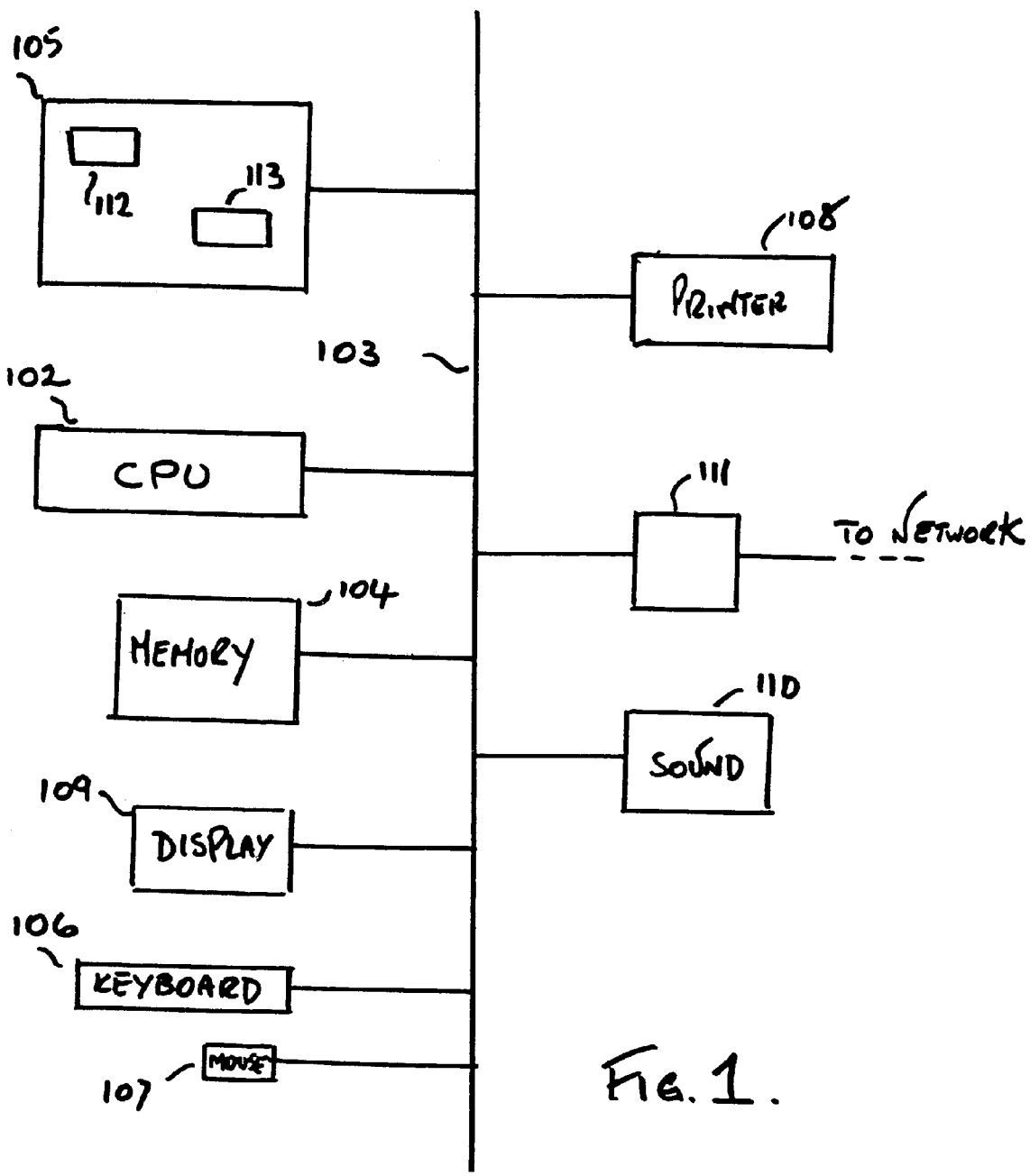
FIG. 1 is a schematic representation of a computer loaded with software embodying the present invention.

In terms of hardware, the system is implemented on a standard desktop computer 101 (FIG. 1).

The computer 101 has a central processing unit 102 connected to a bus 103 for communication with memory 104, a conventional disc storage unit 105 for storing data and programs, a keyboard 106 and mouse 107 for allowing user input and a printer 108 and display unit 109 for providing output from the computer 101. The computer 101 also has a sound card 110 and a network connection card 111 for access to external networks (not shown).

The disc store 105 contains a number of programs which can be loaded into the memory and executed by the processor 102, namely a conventional operating system 112, and a program 113 which provides an interactive voice response apparatus for call steering using a natural language interface.

Figure 2:
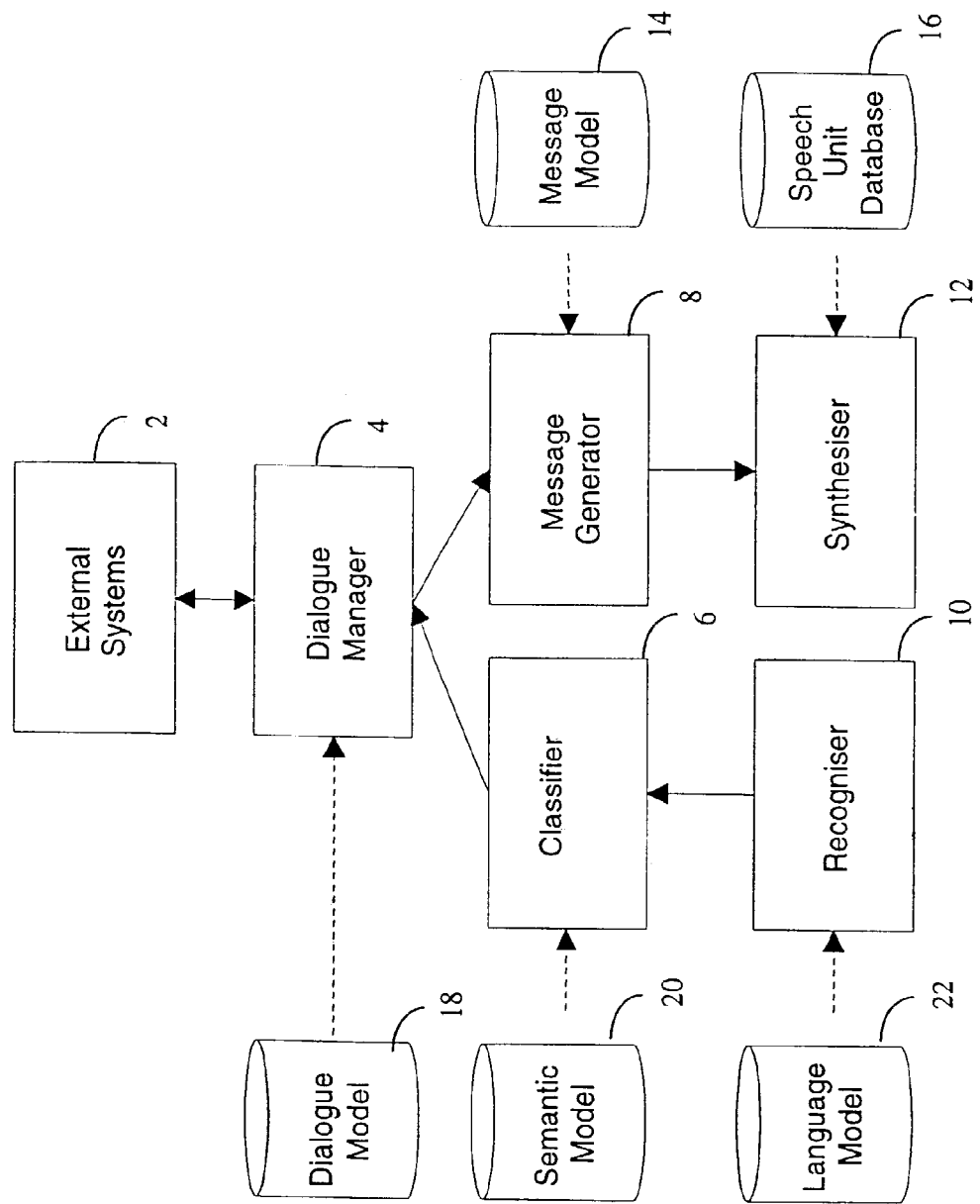
FIG. 2 shows a known architecture of a natural language system.

The program 113 operates in accordance with the architecture represented by the functional block diagram shown in FIG. 2. A user's speech utterance (received by the network card 111 of FIG. 1) is fed to a speech recogniser 10. The received speech utterance is analysed by the recogniser 10 with reference to a language model 22, which is one of a plurality (not shown) of possible language models. The language model 22 represents sequences of words or sub-words which can be recognised by the recogniser 10 and the probability of these sequences occurring.

The recogniser 10 analyses the received speech utterance and provides as an output a representation of sequences of words or sub-words which most closely resemble the received speech utterance. The representation is assumed, in this example, to consist of the most likely sequence of words or sub-words: (alternatively, a "second-choice" sequence, or some other multiple-choice representation such as the known "graph" representation of the mostly likely sequences could be provided.

Because recogniser results are expected to be very error prone, the recogniser also provides confidence values associated with each word in the output representation The confidence values give a measure related to the likelihood that the associated word has been correctly recognised by the recogniser 10. The recogniser output including the confidence measures is received by a classifier 6, which classifies the utterance according to a predefined set of meanings, by reference to a semantic model 20 (which is one of a plurality (not shown) of possible semantic models) to form a semantic classification. The semantic classification comprises a vector of likelihoods, each likelihood relating to a particular one of the predefined set of meanings.

A dialogue manager 4, which will be described more fully later, forms the heart of the system. It serves to control the dialogue, using information from a dialogue model 18. It can instruct a message generator 8 to generate a message, which is spoken to the user via the telephone interface using the speech synthesiser 12. The message generator 8 uses information from a message model 14 to construct appropriate messages. The speech synthesiser uses a speech unit database 16 which contains speech units representing a particular voice The dialogue manager 4 also instructs the recogniser 10 which language model to use for recognising a user's response to the particular generated message, and also instructs the classifier 6 as to the semantic model to use for classification of the response. If text input is required, then the recogniser 10 can be omitted or bypassed.

It receives the user's responses, as output from the classifier 6, and proceeds, potentially, via further prompts and responses, to a conclusion whereupon it issues an instruction (in this example) via the network connection 111, shown in FIG. 2 as external systems 2 (for example, a computer telephony integration link for call control or customer records database).

Figure 3:
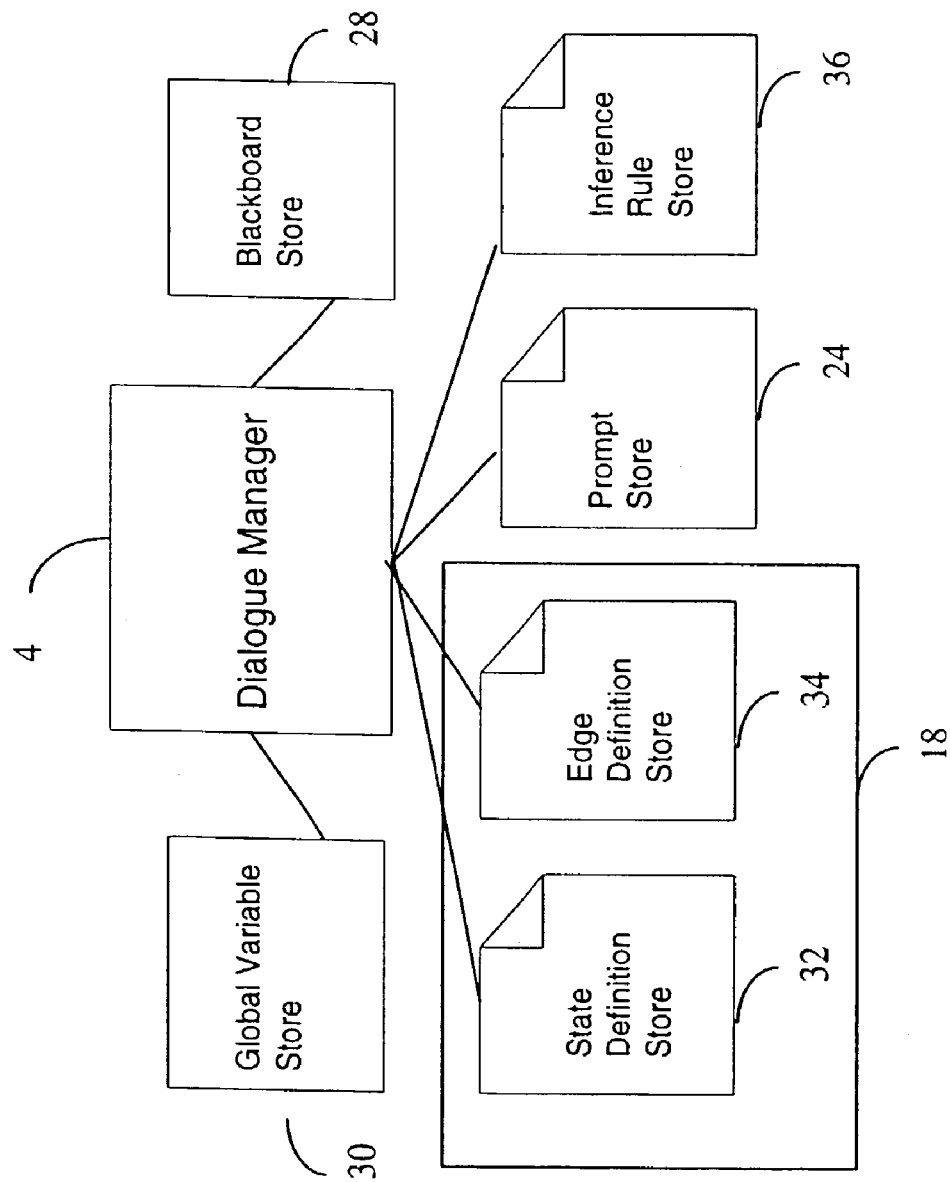
FIG. 3 shows the dialogue manager of FIG. 2 in more detail.

The dialogue manager has a store 28 (FIG. 3), referred to here as the blackboard store, in which it records information gathered during the dialogue. This includes (a) information representing the dialogue manager's current "belief" as to what the user's requirements are, (b) transitory information gained from the dialogue, and (c) a state history.

The dialogue manager uses the state model 18. A number of states are defined by data stored in a state definitions store 34, whilst possible transitions (referred to as edges) from a state to another state (the successor state) are defined by data stored in an edge definitions store 34. This data also includes, associated with the edges, logical conditions involving the information stored in the blackboard store. The state definition data and edge definition data together form the model 18.

The way that the state model works is that the dialogue manager parses the model, in that, starting from a start state, it examines the edges leading from that state and if an edge condition is satisfied it proceeds to the successor state corresponding to that edge. This process is repeated until it can go no further because no edge condition is satisfied (or no edge is present). The state thus reached is referred to as the current state: the identity of this is appended to the state history stored in the blackboard store. This history is used by the dialogue manager to decide on the next prompt (using a prompt store 24). The dialogue manager also serves to enter data into the blackboard store and to manage the blackboard store using inference rules in an inference rule store 36. In practice, the stores 32, 34, 24, 36 are formed from different areas of the store 123 shown in FIG. 1.

The purpose of the dialogue manager 4 is to control a dialogue with the user such that a predefined set of items of information are obtained from the user. Once the predefined set of items has been obtained the process is complete; the dialogue manager has all the information required by the external system 2. In the system described here, items of information obtained from the user are conceptually used to fill slots, the predefined set of items required by the dialogue manager being represented by a set of slots, each slot being filled by each item of information as it is obtained from the user. When an item of information is obtained from the classifier it is represented as three values (referred to in the description as a 'triple'; triple and item of information being used interchangeably in this description) defining a slot name, the item of information and a confidence value representing the likelihood that the item of information has been understood correctly. The three fields of the triple are referred to as "slot:value:confidence". An example of such a triple is "day:Tuesday:0.9" which means that the slot name 'day' has been filled with the item of information 'Tuesday', and the likelihood that 'Tuesday' is correct is 0.9. In an automated call routing call steering task examples of slots to be filled include 'area code', 'day', 'call class'. 'Call class', for example, might be 'Directory Enquiries', Fault Reporting', 'Alarm Call' etc. As slots are filled, the dialogue manager stores such triples in the blackboard store 28. The blackboard store 28 thus holds a representation of the system's current belief of what the user wants to do. Although a typical entry on the blackboard is a triple of 'slot:value:confidence' (so for example 'day:Saturday: 0.5'—the system is 50% sure that the day mentioned by the user is Saturday), details that have been denied by the user (e.g. 'no not Saturday') are also stored on the blackboard, in this case the entry is 'day:Saturday:0'. New results from the most recent user utterance are added to, or combined with, items of information currently held in the blackboard store 28.

By "combined with", we envisage that a further triple in respect of a particular slot for which a triple having the same meaning is already stored in the blackboard store (i.e. where only the confidence differs) may be used to replace the existing entry, or to calculate a replacement entry combining the two results. (In this example, it is assumed that storing two triples differing only in the confidence is not allowed).

One possible algorithm is as follows:

A blackboard contains a list of slots S, each has a set of Values V, with corresponding confidences.

Blackboard merging is a process whereby two blackboards are mathematically combined into a single new blackboard. Within the present context the existing blackboard (containing current system belief) is combined with new results from the latest recognition (regarded as a second blackboard) to form a new blackboard containing the new system belief.

Starting with blackboards A and B this process describes how a new blackboard C (which is initially empty) is populated. Merging is achieved by considering values of each slot (occurring on either blackboard A or B) in turn.

The following notation is used below:

Conf(A,S,V)—is the confidence of slot S having value V on blackboard A (or zero if not defined)

For each slot S occurring on either A and/or B

Where slot S is only present on blackboard A (i.e. no slot values specified on B) the all slot S values from A are added to the blackboard C.

Where slot S is only present on blackboard B (i.e. no slot values specified on A) the all slot S values from B are added to the blackboard C.

Where slots are present both on A and B the results are merged as follows:

For each value V occurring for slot S on either blackboard A and/or B

Add new value for slot S to blackboard C with confidence given by:

$$Conf(C, S, V) = Conf(A, S, V) * \left(\frac{W(A, S)}{W(A, S) + W(B, S)}\right) + Conf(B, S, V) * \left(\frac{W(B, S)}{W(A, S) + W(B, S)}\right)$$

where the weights, W, are defined as follows:

$$weight(A, S) = \frac{\sum_{SpecifiedValues\ in\ A} Conf(A, S, v_i)}{Entropy(A, S)}$$

-continued $$Entropy(A, S) = \sum_{SpecifiedValues\ in\ A} Conf(A, S, v_i) \times \ln(Conf(A, S, v_i))$$

and $v_i$ are one or more values for slot S for which a confidence figure is available on the blackboard.

The entropy above is defined for only specified values on the blackboard. An alternative to this is to calculate the entropy over all possible values of the slot, not just those listed on the blackboard. A maximum entropy approximation is made, whereby all unspecified probability, i.e.

$$\left(1 - \sum_{SpecifiedValues\ in\ A} Conf(A, S, v_i)\right),$$

is uniformly spread over possible, but unspecified, slot values.

A dialogue state definition stored in the dialogue state definition store 32 has the following attributes:

| | |
|---|---|
| Name | (the name of the state) |
| Type | (the type of the state) |
| ConfSlot (optional) | (the name of a slot to be confirmed) |
| NextSlot (optional) | (the name of a slot for which information is to be newly acquired). |

The state name provides a unique identifier which is used to refer to the state. There are six different types of states namely:

| State Type | ConfSlot | NextSlot | Purpose |
|---|---|---|---|
| question | — | Name of one or more slots | get value for a slot or slots |
| imp | Name of slot to be confirmed | Name of one or more slots (optional) | implicitly confirm value of slot (and possibly fill next slot or slots) |
| exp | Name of slot to be confirmed | Name of one or more slots (optional) | explicitly confirm value of slot (and possibly fill next slot or slots) |
| statement | — | — | make a statement where there is no anticipated response (performs no recognition). These tend to be terminal states in the dialogue. |
| null | — | — | used for merging of paths in the dialogue model (performs no recognition and plays no prompt) |
| tag | — | — | used to add an entry to the state history (performs no recognition and plays no prompt) |

ConfSlot lists the slot name which is affected by the user confirming items of information. In this example only one slot is used but more could be used if desired. Such slots will be mentioned in a prompt. A positive or negative response (e.g. yes or no) affects the confidence associated with a particular slot value field in the relevant triple NextSlot lists all the slot names for which the user might provide items of information. Usually these items of information are prompted for explicitly (e.g. 'what day?' would have the NextSlot set to 'day'.

As an example, the state requiring the prompt 'At what time on Monday?' would have ConfSlot equal to 'day' because the 'day' slot is being implicitly confirmed as having the value 'Monday'. NextSlot will be equal to 'time' and 'am/pm' as the user may respond in such a way as to fill the 'time' and/or the 'am/pm' slot(s).

In this embodiment of the invention ConfSlot is only allowed to contain one (or zero) slot names. This means that prompts such as 'what time on Monday morning?' where the 'day' and 'am/pm' slot values are both being confirmed at the same time are not possible.

States are linked by edges. These contain conditions that are examined when the dialogue model is parsed (parsing the dialogue model is described in more detail later with reference to FIG. 7). During parsing, an edge condition must be true in order that one may traverse the edge and consider the next state. Known items of information stored in the blackboard store 28 are examined to determine whether an edge condition is true. An example edge condition is 'day slot is filled and its value has a high confidence of being correct'.

Figure 4:
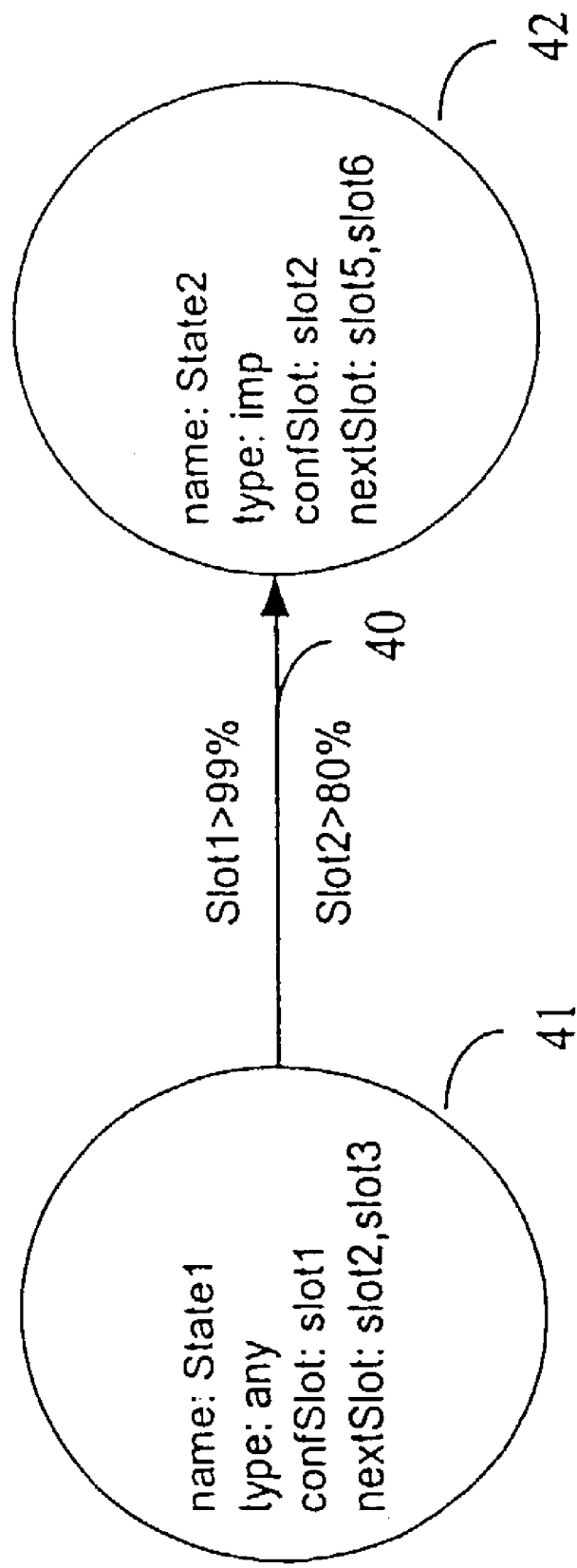
FIG. 4 shows an edge with associated edge conditions connecting two states.

By way of example, FIG. 4 shows two states 41, 42 each with its name, type and associated slot names shown. State 41 is intended to induce the user to confirm the value of slot 1, and supply further information. The model does not allow one to proceed to state 42 (designed to confirm slot 42) unless slot 1 has been confirmed satisfactorily and data for slot 2 has been received with reasonable confidence. Thus the edge condition is that the confidence associated with slot 1 is greater that 0.99 and the confidence associated with slot 2 is greater than 0.8.

Each time it is required for the system to prompt the user a current dialogue state is determined by parsing the dialogue model from a defined start state until a state is found where none of the conditions on edges exiting from that state is met.

Parsing the model every time from the beginning allows the user to move around the dialogue model and correct mis-recognised details rather than following a predetermined dialogue path. This type of dialogue is often referred to as a mixed-initiative dialogue because the user does not have to answer the question posed by the system, but can say something else. Parsing the model every time has the advantage that mistakes at the start of the dialogue do not necessarily persist. For example consider a user's utterance that indicates either a reverse charge call or line test (the classifier is not sure which, but reverse charge has the higher confidence value) together with a clearly understood area code. The first parse of the dialogue model will go to a state where a prompt such 'reverse charge to 01473 . . . ' is played.

When the user clarifies this—e.g. by saying "I wanted the line tested" the dialogue model is reparsed and this time passes to a line test state and the prompt 'line test to 01473 . . . ' will be played. Reparsing every time enables the state to jump from several states down one arm of the dialogue model to several states down a different arm in one move (there is no need to reprompt for the area code in the above case).

Every time information is added to the blackboard store 28 the items are updated according to inference rules stored in the inference rule store 36. After the items have been updated the dialogue model is reparsed from the start state to find the next dialogue state. If the next dialogue state is a null or a tag then the items are updated again according to the inference rules and the dialogue model is reparsed again from the start state.

As mentioned earlier, dialogue manager 4 must inform the recogniser 10 and classifier 6 what language model 22 and semantic model to use for a particular dialogue state. The recognition model to be used for a state can be obtained from the state definition, as indicated in the following table.

| State Type | confSlot | nextSlot | Recognition/Parser model |
| --- | --- | --- | --- |
| question | — | [slot]+ | nextSlot |
| imp | slot | [slot]* | confSlot + y/n + nextSlot |
| exp | slot | [slot]* | confSlot + y/n + nextSlot |
| statement | — | — | — |
| null | — | — | — |
| tag | — | — | — |

A general rule for defining the recognition model can be expressed as: "Use all specified confSlots and nextSlots plus yes/no if the state is either an explicit or implicit confirmation".

Often in a dialogue more than one slot shares the same grammar (e.g. arrival and departure location, and short sequence of digits in a telephone number). [obvious,+time in?

For a yes/no question prompt such as 'Would you like to make another enquiry?' the nextSlot is set to yes/no. In this case the recognition model and semantic model contains only the yes/no grammar.

The manner in which the state history is used to select the most appropriate prompts as will now be described.

Prompts are selected by the dialogue manager using rules. Prompt selection is based on the recent state history using an 'n-gram' to find the most appropriate prompt from the state history list. Rules are prioritised with the rules requiring a longer state history list considered first. If there is no match with a long state history (for example specifying what the last four states must be for that prompt) then the rules for shorter state histories will be used (for example the last three states). This process, known as back-off (or a back-off algorithm) continues until a match is found. Such back-off may continue until a condition based solely on the current state is met. This may be regarded as a default prompt for the state. These default prompts are defined by templates as illustrated by the following table showing for different types of state typical templates that might be present in the prompt store

| State Type | Prompt Template |
| --- | --- |
| question | "Please say <nextSlot>" |
| imp | "<confSlot> thank you. Please say <nextSlot>" |
| exp | "Was that <confSlot>" |
| statement | "Please hold while I do that for you" |

Where the field names inside the < > indicate tokens, to be replaced by actual values. For the state types 'null' and 'tag' no prompt is played and so no prompts need to be specified.

Default prompts as those shown above enable a natural language IVR system to be built quickly, and refined later. Adding in prompts based on longer state histories (i.e. sequences of states in the history rather than just the single, current, state) enables anaphoric references to be used. For example, if you know the previous prompt mentioned 'an alarm call', the following prompt can safely use 'it' to refer to this, rather than repeat the phrase.

The following are examples of entries stored in the prompt store 24:— state0.<welcome>|1.2 state0:state0.<repeatWelcome>|5.0 state1:state2:state3.<when_on> <day> <would_you_like_that>|1.0

Where the syntax is the state history to be matched, a fullstop, the prompt template, a vertical bar and then finally a cost value (to be discussed later). The first example shows a default prompt template for state0. The second example shows that when state0 has been visited twice for example if the user says nothing or when the user's utterance is rejected (i.e. contains no successfully extracted information), a different prompt is used. The third example contains a three state history condition This allows the use of the word 'that' since the user will know what 'that' refers to.

The method of describing the rules for which states in the state history are to be matched may be extended by the use of regular expressions to describe state names. In this way a single rule may match a number of different but potentially similar state histories. As before the longest sequence of states matched will take precedence over shorter lists.

The following are example of entries in the prompt store in this instance state0.<welcome>|1.2 state1 exp.<do_you_want_a line test>|5.0 state2 exp.<do-you_want_a_reverse_charge_call>|5.0 state?exp:state3.<to which code and number>|1.0

In this instance the '?' represents a single character of any value. Regular expression languages typically allow wildcards such as 'one or more character', 'zero or more characters', or 'exactly one character' (as shown in the example above). Any other mechanism supported by standard regular expression pattern matching languages such as that used in the 'perl' programming language could be allowed in this context. In this instance the regular expression-matching engine will always try to match the shortest sequence of symbols.

This mechanism can be further extended by allowing regular expressions patterns to be used in the rules to match the state sequence as a single expression rather than a sequence of expressions. A simple way to implement this is to match each state pattern defined in a rule, one at a time, against the current state history list in a single regular expression match. This may be achieved by representing the state history as a concatenated list of state names delimited by the same delimiter character used in the prompt selection rule descriptions (a colon is used in the examples). Each prompt rule pattern as a whole (from the start of the rule up to the decimal point using the syntax in the example above) is matched with this concatenated representation forcing the match to be anchored against the right hand side of the history list. The rule which matches the longest sequence of states is chosen as the matching rule. If there is more than one rule which matches the same number of states then the one with the greater number of exact state matches will be selected.

Consider the following example rule:

State2:(State?:)+
State6.<Please_hold_I_will_do_that_for_{you}>|5.0

This rule matches 'State2' followed by one or more (the plus symbol) states matching the pattern 'State' followed by a single character (the question mark symbol), ending with 'State6'.

In normal usage rules for the current state will always end in the name of the current state but they need not necessarily do so.

The output from the dialogue manager to the message generator 8 is a template of the required prompt (e.g. "<what_time_on> <day> <what_day_at> <time>", "<reverse_charge_to> <area>"). The template contains a sequence of tokens, shown in angle brackets [inconsistent plain text shown inside chevrons here, but not in the table above]. Tokens need to be replaced by values (replacing the <day> token with the day stored on the blackboard for example). The message generator 8 receives the template and turns it into a list of speech files to be sent to the synthesiser 12. Alternatively a text-to-speech synthesiser may be used, and text rather than speech files may be sent to the synthesiser. If text output is wanted, the text strings could be output directly. The message generator 8 uses information from the message model 14 which associates text or token values with speech files. Some templates have associated conditions which must be fulfilled in order to use that template. The condition refer to the items of information stored in the blackboard store 28 or the global variable store 30.

The following is an example of information stored in the message model 14:—

<welcome>.Hello? What can I do for you? | regreet.wav:greet = = TRUE
<welcome>.Hello? How can I help you? | starts2.wav:silence = = TRUE
<welcome>.Hello. This is the automatic operator. How can I help you? | start.wav:TRUE Where the syntax is the token, fullstop, plain text (to be used for duplicate prompt detection), a vertical bar, the speech file name, and a colon followed by the condition.

Three different speech files (with a .wav file extension) can be played when system is to play out the <welcome> token. The entries are checked in order and the speech file with the first satisfied condition used. The items of information (i.e. the slots "greet" and "silence" stored in the blackboard store 28 are used to determine which one is appropriate. The third statement is unconditional.

Another example is generating the message required for a template such as: "<greeting> <what_time_on> <day>". The prompt is constructed using the following information in the message model 14.

<what_time_on>.what time on | whatTimeOn.wav
<greeting>.Good morning | goodMorning.wav: 0000 < = systemTime < 1200
<greeting>.Good afternoon | goodAfternoon.wav:1200 < = systemTime < 1800
<greeting>.Good evening | goodEvening.wav:1800 < = systemTime < 2400
<day>.Monday | Monday.wav:day = = Monday
<day>.Tuesday | Tuesday.wav:day = = Tuesday
etc.

So the example "<greeting> <what_time_on> <day>" would generate the following list of speech files to be sent to the synthesiser 12: "goodMorning.wav whatTimeOn.wav Monday.wav"

Templates can reference other templates. A token <time_of_day> for example may contain a time token together with either an am/pm token, for example:

```
<time of day> . <time> <am/pm> : TRUE
<am/pm> .a m | am.wav:am/pm = = am
<am/pm> .p m | pm.wav:am/pm = = pm
<time> . <hour> <o'clock> :minutes = = 0
<time> . <halfPast> <hour> :minutes = = 30
<time> { <hour> <minutes> } etc.
<o'clock> .o'clock | o'clock.wav:TRUE
<halfPast> .half past | halfPast.wav:TRUE
<hour> .one | one.wav:hour = = 1
<hour> .two | two.wav:hour = = 2
etc.
```

Inference rules stored in the inference rule store 36 update the contents of the blackboard store 28. For example an inference rule might specify if the time specified is 2 o'clock today and the current time is after 2 am then assume the user requires pm (when setting up a future alarm call).

Inference rules are also used to remove transient items from the blackboard. For example if a user says 'yes' this is added to the blackboard store (as an entry such as 'confirm:y:0.95'). Although this is important whilst in the current dialogue state, it must be removed before the next user utterance is recognised so that is not interpreted as a response to subsequent confirmation prompts. The user's utterance may be classified as a greeting (the user says "hello"). In this case the triple 'callClass:greet:value' will be present in the blackboard store 28. This must be removed when a new state is entered to prevent repetitive regreeting behaviour. Finally the blackboard may contain a third type of transitory item—a flag indicating that the user remained silent. The purpose of this item is to modify the prompt that is played next time (although the dialogue state will not have changed) to give more instructions and encourage the user to speak. Again this item is removed when before the next user utterance is recognised.

An inference rule can also be used to add information to the blackboard store 28, such as area code from another source (such as CLI). For example, if a user who gives a phone number without an area code, it is entirely appropriate to ask 'is that 01473?' based on an assumption that the phone number is local (this is something operators naturally do).

As mentioned previously each prompt wording has a cost associated with it. This gives a measure of 'how well the system is doing'. Default costs for each state type (question, imp, exp, etc.) can be set automatically when the default prompts were constructed. As before, these values can then be refined by hand. When additional prompts are added their associated costs must be set. In particular prompts used when the current state has not changed (e.g. 'state1 state2 state2') would have a higher cost. Such states indicate a lack of progress through the dialogue. This is possibly due to the user remaining silent, saying something from which no useful information has been extracted (in effect the utterance has been rejected), or correcting an error. All of these lead to an over-length dialogue and poor user opinion, and so a higher cost.

As the dialogue model is parsed during a call the costs associated with each prompt used are summed.

Some prompts can have a negative cost associated with them which reduces the summed cost. These states represent dialogue milestones such as the collection of a complete telephone number. Once such a milestone has been passed the user's perception of the system is likely to be enhanced—a negative cost models this.

In other embodiments of the invention the cost can also decay with time to model short term memory effects of the user.

A cost threshold is set and if the summed cost exceeds the cost threshold this is detected and the user is passed to a human operator.

A second, lower, cost threshold is specified to give an early warning that a call is in trouble. An operator can then be allowed to monitor the call briefly—taking over seamlessly from the automated system if necessary. The operator can leave the call if dialogue progress is being made.

According to a further feature, it can be arranged that the automated dialogue is terminated and the user is connected to a human operator whenever a prompt wording is to be generated which is the same as the immediately preceding prompt delivered to the user. Since there are many possible paths through the dialogue (including many repetitions of the same prompt state) it is not possible to cover every eventuality of the state history with an appropriately worded prompt. Thus each time a prompt is played, the prompt is also stored in suitable form. When a fresh prompt is generated it is compared, before it is played, with the stored one. The current and previous prompt must be identical in their spoken form, not in the prompt template selected from the n-gram. So for example, 'when on<day>?' can be repeated provided the day slot has a different value.

When no prompts other than default prompts have been defined, there is a strong probability of repetition of the same prompt. Using longer-history prompts will reduce the risk of exposing users to repeated prompts. This is a very powerful means of preventing a repetitive dialogue—the extra effort in adding in additional prompts will increase the system throughput without exposing the limits of the dialogue prompts available.

Figure 7:
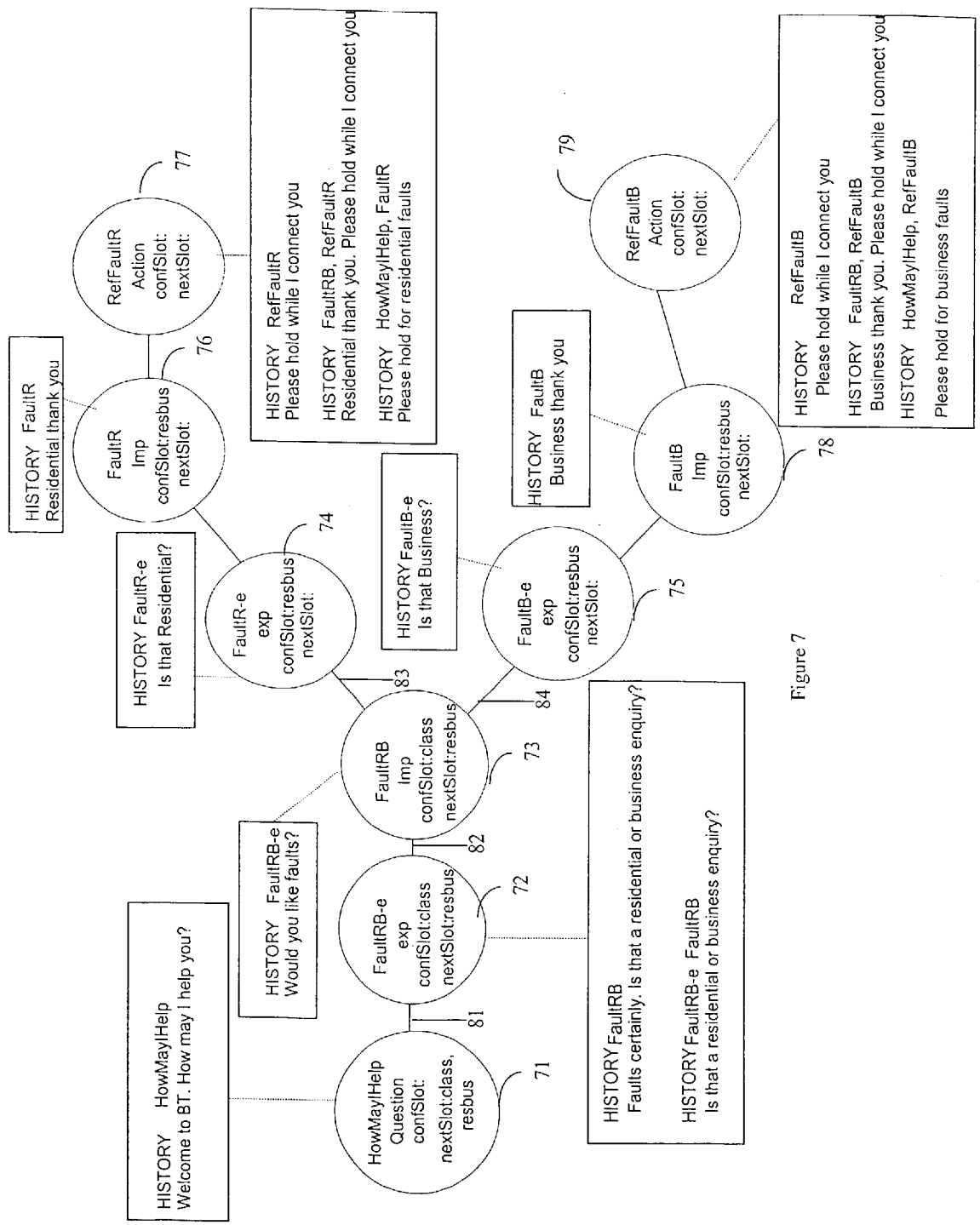
FIG. 7 shows a dialogue model for part of a fault reporting dialogue.

Note that the criterion for operator handover could be identity of wording, in which case the comparison would be between text strings (with tokens translated). Alternatively the generated string of speech file names could be stored, and the newly generated string of speech file names compared with it. This admits of the possibility of two prompts of identical wording but with different stress (e.g. "Please say the name again") being regarded as non-identical FIG. 7 is an example dialogue model representing a user calling to report a fault. Fault enquiries are referred either to a residential helpline or a business helpline. The dialogue has to confirm that the user wants faults and to determine which number to refer them to. States numbered 72, 74, 75 are explicit confirmation states which have been added to the dialogue automatically as described above. These states are only used when the dialogue manager is unsure of an item and requires explicit confirmation (i.e. 'was that residential?'). Prompt templates for each state are shown together with an associated state history required in order to use that prompt template. Most of the prompt templates are default templates requiring a single state history, but there are some with a history of two states (e.g. 'HowMayIHelp, RefFaultB'—which means a direct jump from 'HowMayIHelp' to the current state of 'RefFaultB'). Each state has a name (e.g. 'FaultRB-e'), a type (e.g. 'exp'), and then specified slots for 'confSlot' and 'nextSlot'. In this example only two slots are used.

Figure 8:
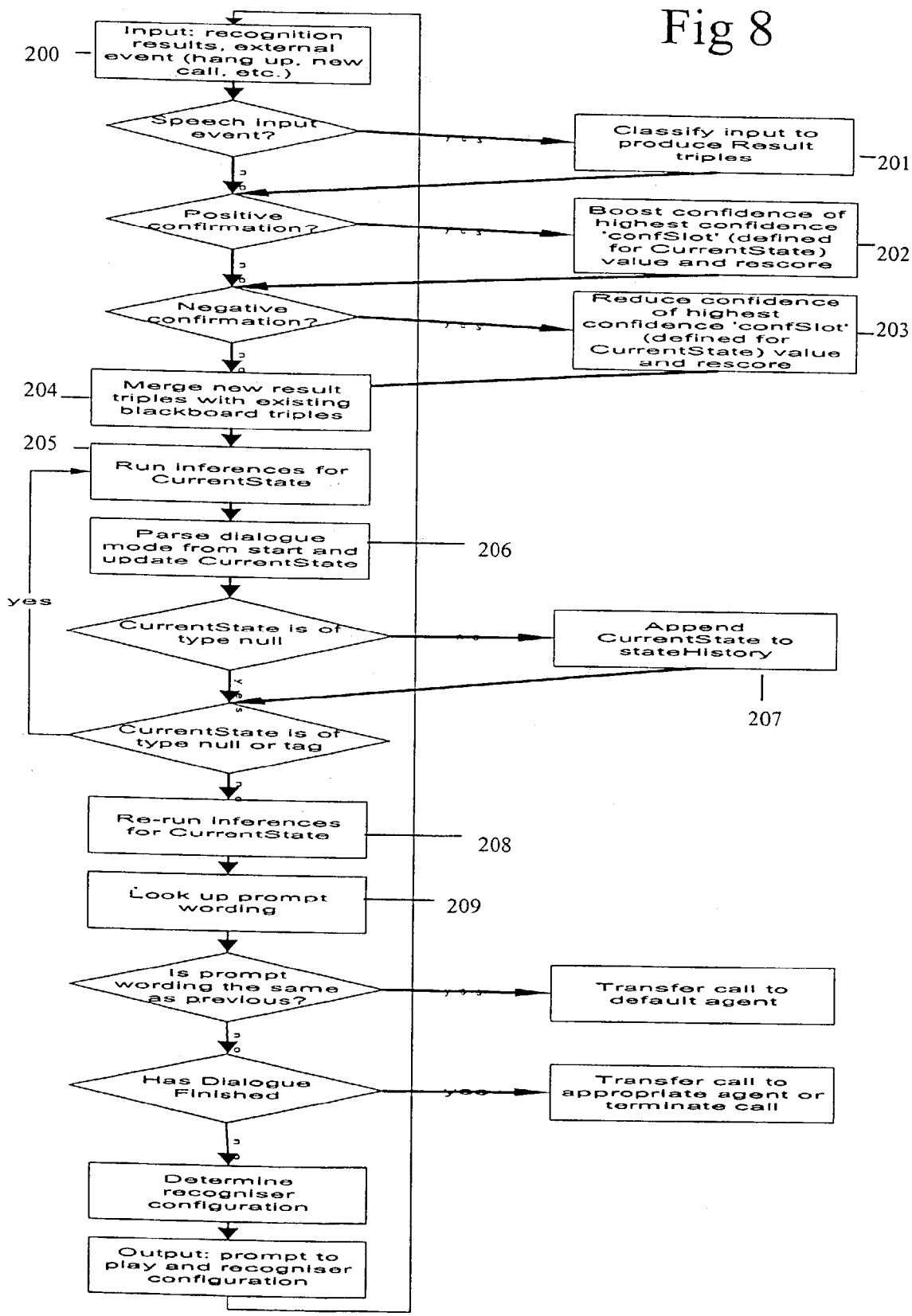
FIG. 8 is a flowchart of the operation of the dialogue manager.

FIG. 8 is a flowchart showing the operation of the dialogue manager. The process begins at 200 on the occurrence of some event, such as the recognition of speech by the recogniser 10, or some external event such as the commencement or termination of a telephone call to the apparatus. If speech is recognised, it is classified at 201 by the classifier 6. If the resulting triple represents a positive or negative confirmation the confidence recorded in the blackboard store is adjusted accordingly (202, 203). At the same time, any other values present for the same slot are scaled so that the total of confidences for that slot remains the same. (Though this could if desired be dealt with as part of the merging process which follows). The new result triples are merged with the existing blackboard triples (204). At step 205, the inferences are run, as described earlier. The dialogue model is then parsed (206) from the starting state and the current state is recorded. Unless the current state is null, it is appended to the history store at 207. If the current state is a null or tag type, the process jumps back to step 205, otherwise the inferences are re-run (208) and the prompt definition is generated at step 209, based on the contents of the history store. If the prompt is the same as the previous one, transfer to an operation is initiated at step 210. Note that the prompt definition generated for an end state may, instead of (or in addition to) defining an actual prompt, contain a command indicating action to be taken upon termination of the dialogue. If such a command is found, corresponding action is taken at 211.

Assuming that neither of these events occurs, the recogniser and classifier configuration required for the next prompt is determined at 211. Here the dialogue manager searches the prompt store to find the entry having the longest match to the contents of the history store and for which any conditions contained in the entry are satisfied. At step 212 the prompt is delivered to the synthesiser 12 and the configuration loaded into the recogniser 10 and classifier 6 ready for the next user input. The process then returns to step 200, to await the user's response.

An example of the parsing process will now be described with reference to FIG. 7. Consider the start state 71. Initially the edge condition required to move to the next state 72 is false. Thus the first parse stops at state 71, which is recorded as the current state. The required prompt is generated and output to the user via the speech synthesiser 12. The recogniser 10 recognises the user's response and then the recognised utterance is classified by the classifier 6. The result of the classification is combined with the results already stored in the blackboard store 28 and the inference rules are used to update the blackboard store 28. The dialogue model is then reparsed by initially considering the start state 71: considering the interconnecting edge 81 connecting the start state 71 to the next state 72, if the edge condition 81 is true then one moves on to considering the edge conditions connecting state 72 to subsequent states. This process is repeated considering edge conditions in turn—note, for example, that the edge conditions 83 and 84 are considered in a particular order, in this case condition 83 is considered before condition 84 although in this example the conditions are mutually exclusive so the order in which the edges are considered makes no difference to the end result. When an edge condition to a next state is true then the exit conditions from that next state are then considered. When no considered edge conditions from a state are true, that state becomes the current state.

Three example dialogues with a user, based on the dialogue model of FIG. 7 are now described.

Firstly a typical enquiry example:—
system: Welcome to BT. How may I help you?
user: Can I have faults please (callClass is recognised as "faults" with a high enough confidence to avoid the need for explicit confirmation. The dialogue network is traversed from the start and moves to the FaultRB state 73 where the system prompt is played)
system: Faults, certainly. Is that a residential of business enquiry?
user: Residential (this time the recognition of 'residential' is less confident—still confident enough to prevent an explicit confirmation, but not enough to complete the call. The dialogue enters state FaultR and asks an implicit confirmation)
system: Residential thank you
user: silence (as state FaultR 76 is an implicit confirmation state silence boosts the confidence of the confirmed data, in this case residential. The network is now traversed again and this time the state RefFaultR is reached—a terminal statement state).
system: Please hold while I connect you.

Another possible dialogue, where explicit confirmation is needed at every stage (i.e. unclear speech) is show as follows:—
system: Welcome to BT. How may I help you?
user: Faults please
system: Would you like faults
user: Yes
system: Is that a residential or business enquiry? (using the prompt for history 'FaultRB-e FaultRB')
user: Residential
system: Is that residential?
user: Yes
system: Please hold while I connect you Another example is of a user who is recognised with high confidence and speaks all the details in one turn
system: Welcome to BT. How may I help you?
user: Residential faults please
system: Please hold for residential faults (using prompt for history 'HowMayIHelp RefFaultR')

The IVR program 109 can be contained on various transmission and/or storage mediums such as a floppy disc, CD-ROM, or magnetic tape so that the program can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

In the above example, as is usual in known systems, the dialogue model, prompts and inference rules are generated manually (referred to in this description as 'hand-coded') for a specific application. For good interaction with a user some hand-coding is necessary; however a degree of automation can be applied to the construction of the dialogue model if desired.

Knowledge of the system domain is used to manually generate state definitions based on human-human (H-H) dialogues. Our international patent application no. PCT/GB00/04904 describes a method of automatically generating state definitions from a corpus of transcribed H-H dialogues which are suitable for use here. These state definitions are then augmented by adding new state definitions that are not found generally in H-H dialogues, but are necessary for human-computer (H-C) dialogues. This augmentation will be described more fully later.

Edges are initially added by hand. These define valid state transitions and use knowledge of the domain (e.g. to set up a particular service a day, time and name are required). Initially the edges do not contain conditions, they merely define the permissible dialogue paths. Conditions are added manually, which are based on the most likely value for a slot rather than on whether the value has a particular confidence value associated with it. An example of such a condition is that the day slot is filled and the most likely value is Monday.

In this embodiment of the invention edge conditions are automatically added using the ConfSlot attributes of the two states that they connect. This process is now described with reference to FIG. 4. [not really clear what the algorithm is, though] An edge 40 exits from state 41 and enters state 42 which may be an 'imp' (implicit confirmation) or 'exp' (explicit confirmation) type state. The confidence value of the slot name in ConfSlot of the state 41 from which the edge is exiting must be greater than a predetermined value, in this example, this confidence value must be greater than 99%. The confidence value for a slot named in NextSlot (in this case Slot2) must also be greater than a predetermined value, 80% for an implicit confirmation as shown in FIG. 4 or greater than 30% for an explicit confirmation Thus, for an edge leading from an implicit or explicit confirmation type state, a condition is added to the effect that the confidence for the value being confirmed exceeds a respective predetermined value.

For an edge leading to an implicit or explicit confirmation state, a condition is added to the effect that the confidence for the value to be confirmed exceeds a respective predetermined value.

Figure 5:
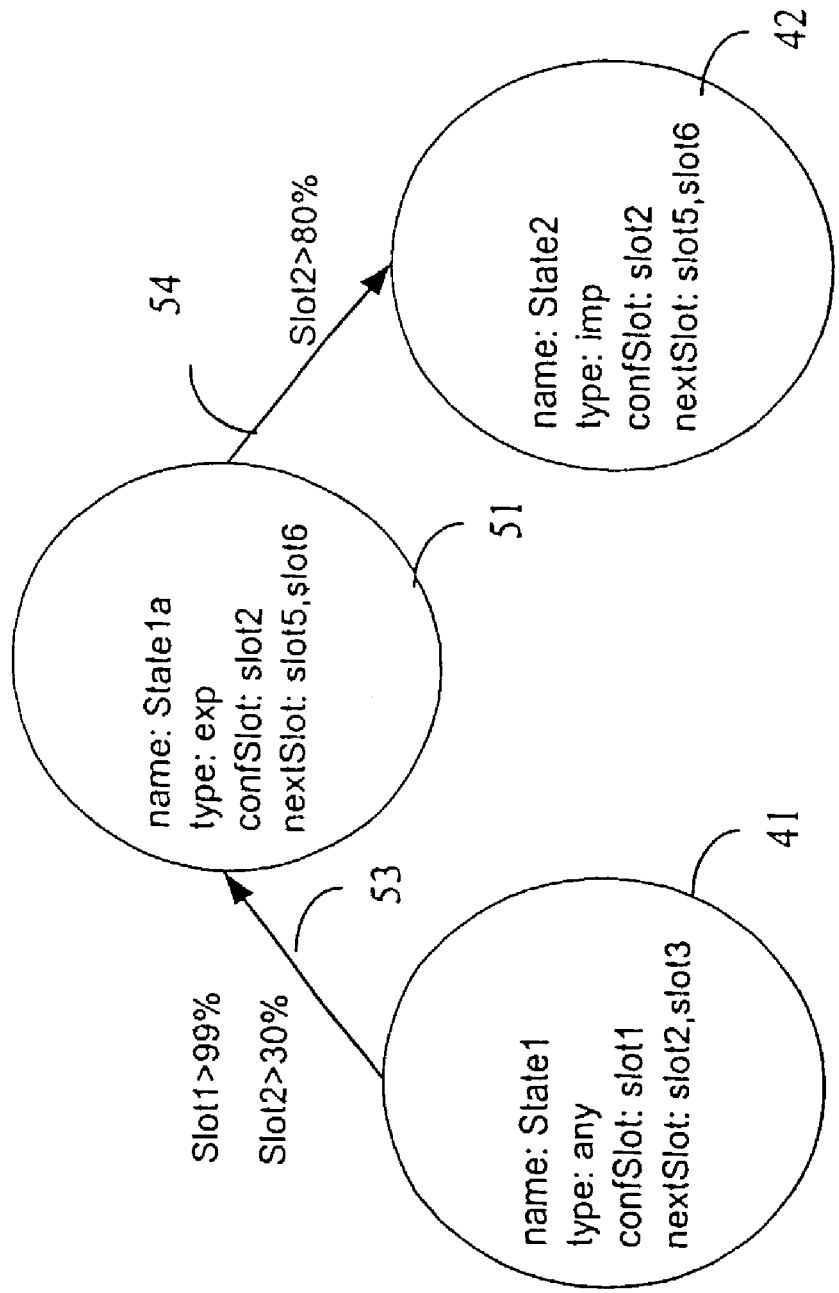
FIG. 5 shows an automatically added explicit confirmation state.

Refer now to FIG. 5 which shows the dialogue states of FIG. 4 after another state 51 has been added. Speech recognisers make more mistakes than humans do and so H-C dialogues are different from H-H dialogues. In particular H-C dialogues often contain explicit confirmation (i.e. 'did you say Tuesday') which rarely occur in H-H dialogues. A new explicit confirmation state 51 can be added automatically before the implicit confirmation state 42. The ConfSlot state attribute of the implicit confirmation state is used to set edge conditions shown on edges 53 and 54.

The additional explicit confirmation state 51 is based on a copy of the implicit state 42. However the edge conditions are altered as shown in FIG. 5. A new threshold (in this example, 30%) is needed. The threshold for explicit confirmation is lower than for implicit confirmation; if the system is unsure about a piece of information it is best to explicitly confirm it rather than use an implicit confirmation.

Thus, prior to an implicit confirmation type state, an explicit confirmation type state is added, and conditions added as described above.

The values of 30%, 80% and 99% used in this example specify respectively:

Minimum confidence in a result required before an explicit confirmation is requested Minimum confidence in a result required before an implicit confirmation is requested (skipping the explicit state)

Minimum confidence in a result required to skip the implicit confirmation state

When an item is explicitly or implicitly confirmed its confidence is increased. Explicit confirmation requires a positive (e.g. yes, yeah) response to boost the confidence, or a negative response (no, that's wrong, etc.) to lower the confidence. For an implicit confirmation the same rules apply, but a neutral response (e.g. silence, or just giving additional information) also boosts the confidence. This is the only difference between an implicit and explicit confirmation.

Figure 6:
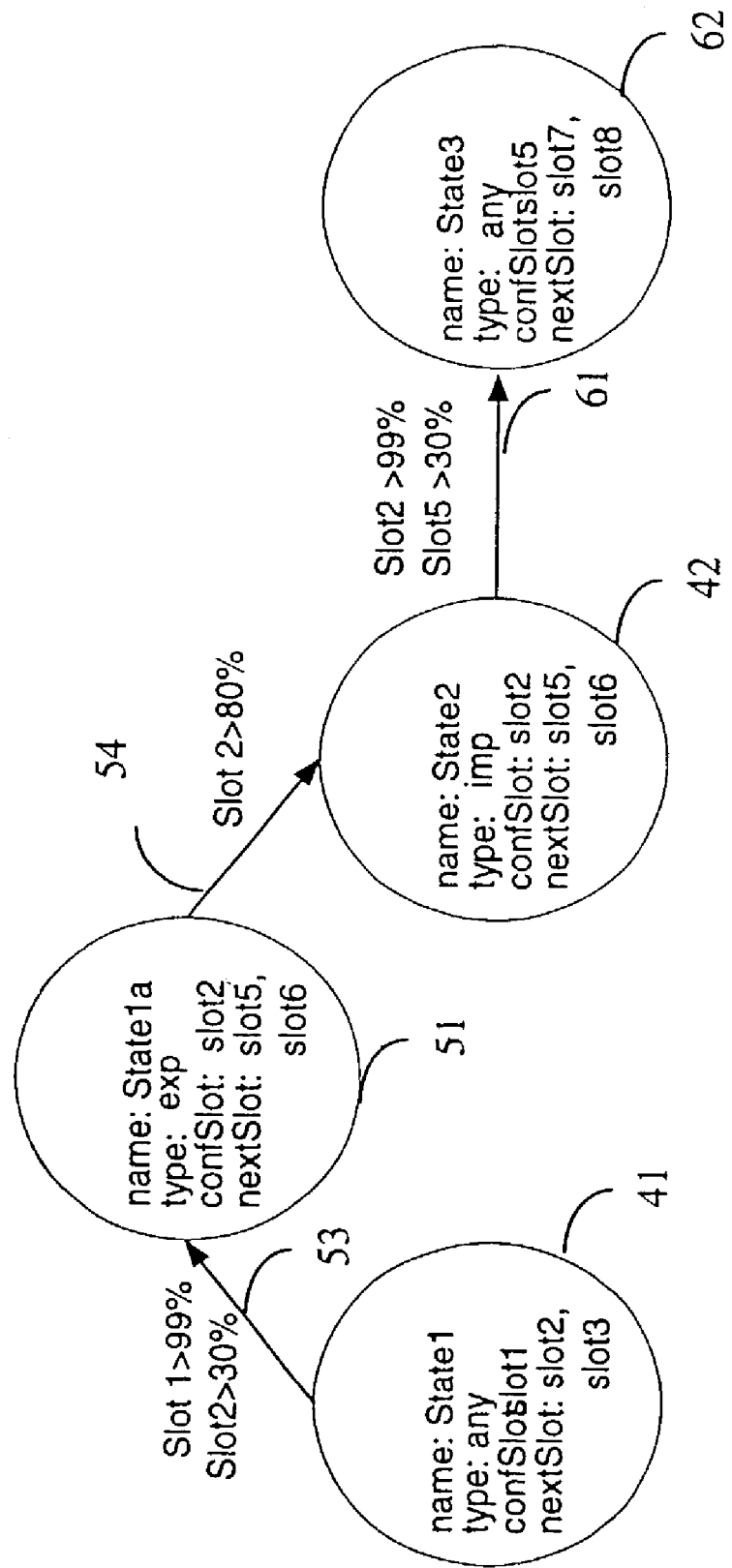
FIG. 6 illustrates edge condition which allow a state to be skipped in a dialogue.

Two values are needed: the explicit and implicit confirmation confidences values. In this example, values of 100% and 99.5% are used. An explicitly confirmed item is taken as definitely correct, and an implicitly-confirmed item has a slightly lower confidence value. An example is shown in FIG. 6: that for an item (in slot2) has been explicitly confirmed (in State1a 51). Therefore when the dialogue model is parsed again then the implicit confirmation state (State2 42) becomes redundant and is skipped (as the slot2 confidence has been set to 100% and the edge condition 54 and the edge condition 61 are both true). The current state for the next interaction with the user is State3 62.

Alternatively the value for the confidence of an explicitly confirmed item can be based on the recognition accuracy of a 'yes/no' recognition (usually nearer 98%). Similarly the confidence for an implicit confirmation can be set based on recognition performance together with the proportion of people who correct such prompts.

It is important that the confidence values for implicit and explicit confirmation are consistent with the global values used to set edge conditions. Otherwise it may not be possible to escape a state and the user will remain trapped in that state.

The classifier 6 returns a confidence measure on a yes/no speech recognition, so in other embodiments of the invention it would be possible to incorporate this into the relevant triple stored in the blackboard store 28. For example if the classifier 6 is 100% sure the user said yes, the confidence of the confirmed slot is set to 100%. If, on the other hand, the yes/no recognition confidence is only 70% then this confidence could be set to 70%.

The costs associated with each prompt and cost thresholds require manual setting. To enable this the dialogue model is randomly exercised to find the sort of interactions that are possible. The cost threshold is adjusted to eliminate interactions that are unacceptably long.

In summary a dialogue model is created by the following steps:

1) define states (manually defined from corpus of H-H interactions)
2) manually define links between states
3) manually define slot content conditions on some edges
4) automatically augment with confirmation states
5) automatically add conditions to edges (using pre-defined confidence thresholds)
6) automatically generate a default prompt for each state
7) automatically add costs to prompts
8) adjust confidence conditions on edges. For example explicit confirmation of a slot can be forced by setting a high confidence thresholds.
9) manually edit the default prompt for each state
10) manually add prompts for each state according to a particular state history
11) randomly exercise model to set cost thresholds for directing a user to the operator.

The invention claimed is:

1. An interactive dialogue apparatus comprising:
means for generating prompts to be output;
means for processing input responses to produce response data;
a store for storing response data;
a store storing data defining an initial state, a plurality of subsequent states, possible transitions between states, and for each transition an associated condition to be satisfied before that transition is deemed allowable, at least some of said conditions involving the stored response data; and control means operable to
(a) perform a parsing operation in which it examines whether transition conditions are satisfied so as to identify a subsequent state in respect of which—
  (i) the condition(s) associated with the transition(s) from a reference state to that state are satisfied, and
  (ii) no conditions associated with any transition from that state are satisfied;
(b) select, in dependence upon the state thus identified, a prompt to be output; wherein the control means is operable upon receipt of a response to repeat the parsing operation using said initial state as the reference state.

2. An apparatus according to claim 1, including a state history store, the control means being operable to record the identified state in the history store; wherein the apparatus includes a prompt definition store for storing a plurality of prompt definitions, each prompt definition having a sequence of one or more states associated with it, and the control means is arranged to select the prompt in dependence upon the longest sequence of states in the prompt definition store which sequence of states is equal to a sequence of the most recent one or more states stored in the state history.

3. An apparatus according to claim 1 including means for storing the most recent prompt that has been output; and means operable to compare the selected prompt with the stored most recent prompt and in the event of a match to terminate the dialogue process.

4. An apparatus according to claim 1, in which the or a store for storing a plurality of prompt messages contains data representing for each message an associated cost and in which the control means is operable, when the message is generated, to add the associated cost to a total cost, and, if the total cost exceeds a predetermined monitor value, to connect the apparatus to a monitoring station.

5. An apparatus according to claim 1, in which the or a store for storing a plurality of prompt messages contains data representing for each message an associated cost and in which the control means is operable when the message is generated, to add the associated cost to a total cost, and, if the total cost exceeds a predetermined transfer value, to transfer operation to an operator station and disconnect the apparatus.

6. An apparatus according to claim 1 for use with spoken responses, in which the response processing means includes a speech recogniser.

7. An apparatus according to claim 1 for use with spoken prompts, in which the prompt generating means includes a speech synthesiser.

8. An interactive dialogue apparatus comprising:
means for generating prompts to be output;
means for processing input responses to produce response data;
a store for storing response data;
a store storing data defining an initial state, a plurality of subsequent states, possible transitions between states, and for each transition an associated condition to be satisfied before that transition is deemed allowable, at least some of said conditions involving the stored response data;
a state history store; and control means operable to
(a) perform a parsing operation in which it examines whether transition conditions are satisfied so as to identify a subsequent state in respect of which—
  (i) the condition(s) associated with the transition(s) from a reference state to that state are satisfied, and
  (ii) no conditions associated with any transition from that state are satisfied;
(b) record the identified state in the history store;
(c) select, in dependence upon the contents of the history store, a prompt to be output;
wherein the apparatus includes a prompt definition store for storing a plurality of prompt definitions, each prompt definition having a sequential pattern of one or more states associated with it, and the control means is arranged to select, of those prompts having associated with them a sequential pattern which matches at least the most recent part of the sequence of states in the state history store, the prompt having the longest such match.

9. An interactive dialogue apparatus comprising:
means for generating prompts to be output;
means for processing input responses to produce response data;
control means operable to perform a dialogue process in which it selects, in dependence upon the response data, a prompt to be output; means for storing the most recent prompt that has been output; means operable to compare the selected prompt with the stored most recent prompt and in the event of a match to terminate the dialogue process.

10. An apparatus according to claim 9 in which the control means is operable to store the prompts in text form, and to perform said comparisons upon text strings.

11. An apparatus according to claim 9 in which the control means is operable to store the prompts in the form of a list of one or more file names representing stored speech, and to perform said comparisons upon file name lists.

12. A method of operating an interactive dialogue with a user comprising:
processing input responses to produce response data;
storing response data;
performing a parsing operation by reference to a dialogue model defined by stored data defining an initial state, a plurality of subsequent states, possible transitions between states, and for each transition an associated condition to be satisfied before that transition is deemed allowable, at least some of said conditions involving the stored response data;
wherein said parsing operation involves
(a) examining whether transition conditions are satisfied, so as to identify a subsequent state in respect of which—
  (i) the condition(s) associated with the transition(s) from a reference state to that state are satisfied, and
  (ii) no conditions associated with any transition from that state are satisfied;
(b) selecting, in dependence upon the state thus identified, a prompt to be output;
and wherein upon receipt of a response the parsing operation is repeated using said initial state as the reference state.

13. A method according to claim 12 including recording the identified state in the history store; wherein the selection of the prompt is carried out by reference to a plurality of stored prompt definitions, each prompt definition having a sequence of one or more states associated with it, and selecting the prompt in dependence upon the longest sequence of states in the prompt definition store which sequence of states is equal to a sequence of the most recent one or more states stored in the state history store.

14. A method according to claim 12 including storing the most recent prompt that has been output; and comparing the selected prompt with the stored most recent prompt and in the event of a match to terminate the dialogue process.

15. A method according to any one of claims 12 in which the responses are received in spoken form and processed by a speech recogniser.

16. A method according to any one of claims including 12 including generating the prompts in spoken form.

17. A method according to claim 12, including the generation of said stored model data by
  (i) generating an initial set of data;
  (ii) replacing data defining a transition to a state corresponding to an implicit confirmation with data representing an additional state corresponding an explicit confirmation, a transition to said additional state, and a transition from said additional state.

18. A method according to claim 12 including the step of adding, for a transition leading from a state which corresponds to confirmation, data defining a condition that a confidence associated with the value confirmed exceeds a predetermined amount.

19. A method according to claim 12 including the step of adding, for a transition leading to a state which corresponds to confirmation, data defining a condition that a confidence associated with the value to be confirmed exceeds a predetermined amount.

20. A data carrier loadable into a computer and carrying instructions for enabling the computer to perform a method according to claims 12.

21. A method of operating an interactive dialogue with a user comprising:
  generating prompts to be output;
  processing input responses to produce response data;
  storing response data;
  performing a parsing operation by reference to a dialogue model defined by stored data defining an initial state, a plurality of subsequent states, possible transitions between states, and for each transition an associated condition to be satisfied before that transition is deemed allowable, at least some of said conditions involving the stored response data; wherein said parsing operation involves
  (a) examining whether transition conditions are satisfied so as to identify a subsequent state in respect of which—
    (i) the condition(s) associated with the transition(s) from a reference state to that state are satisfied, and
    (ii) no conditions associated with any transition from that state are satisfied;
  (b) recording the identified state in a history store;
  (c) selecting, in dependence upon the contents of the history store, a prompt to be output;
and wherein the selection of the prompt is carried out by reference to a plurality of stored prompt definitions, each prompt definition having a sequence of one or more states associated with it, and selecting the prompt in dependence upon the longest sequence of states in the prompt definition store which sequence of states is equal to a sequence of the most recent one or more states stored in the state history store.

22. A method of operating an interactive dialogue with a user comprising:
  generating prompts to be output;
  processing input responses to produce response data;
  performing a dialogue process involving selecting, in dependence upon the response data, a prompt to be output;
  storing the most recent prompt that has been output;
  comparing the selected prompt with the stored most recent prompt and in the event of a match to terminate the dialogue process.

23. A method according to claim 22 in which the prompts are stored in text form, and said comparisons are performed upon text strings.

24. A method according to claim 22 in which the prompts are stored in the form of a list of one or more file names representing stored speech, and said comparisons are performed upon file name lists.

* * * * *